Figure 1:
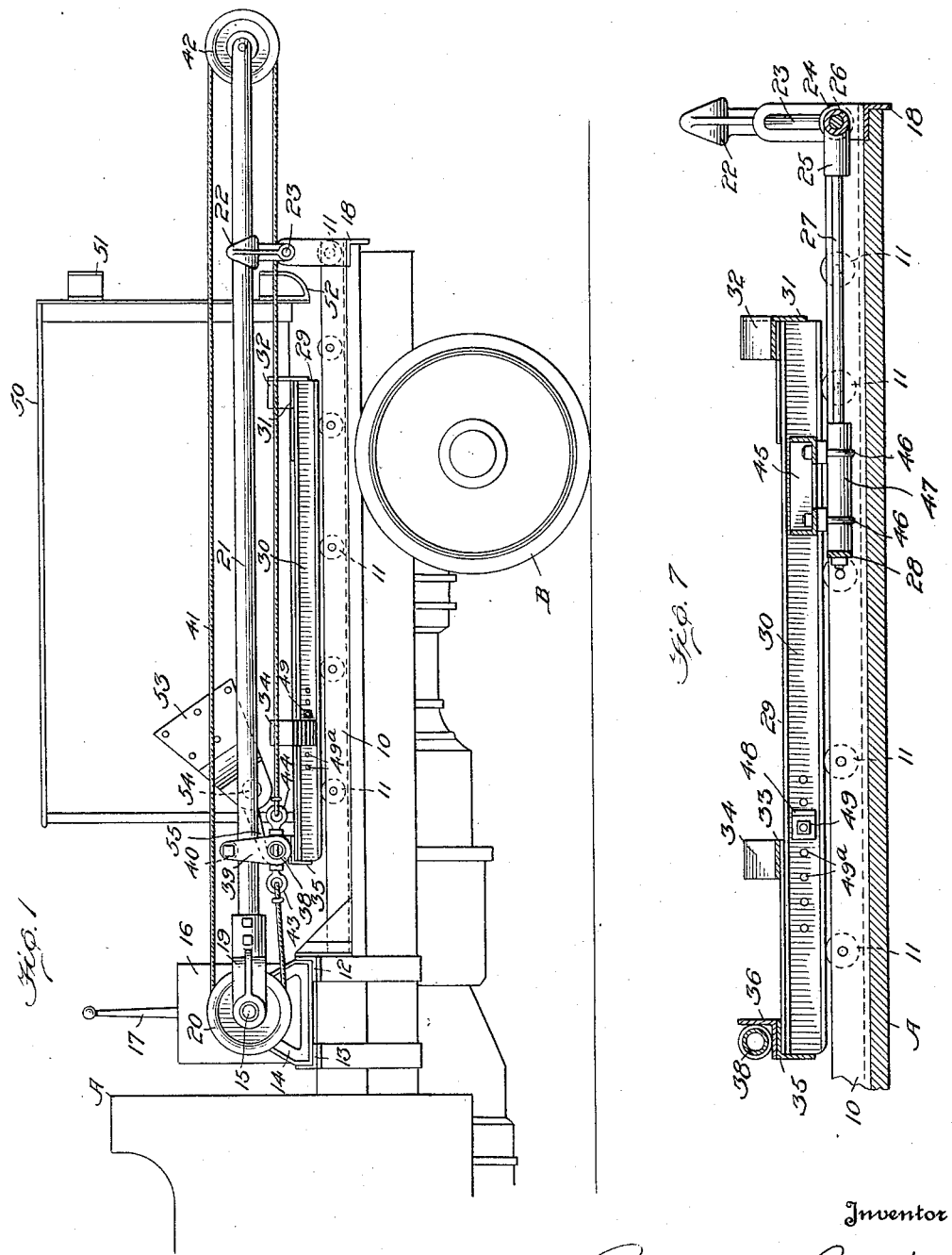

July 12, 1932.  R. A. FONTAINE  1,866,640
SHIFTABLE BODY TRUCK
Filed Sept. 25, 1929   4 Sheets-Sheet 1

Inventor
Robert A. Fontaine
By his Attorney

July 12, 1932.    R. A. FONTAINE    1,866,640
SHIFTABLE BODY TRUCK
Filed Sept. 25, 1929    4 Sheets-Sheet 3

Fig. 3

Fig. 6

Inventor
Robert A. Fontaine
By his Attorney

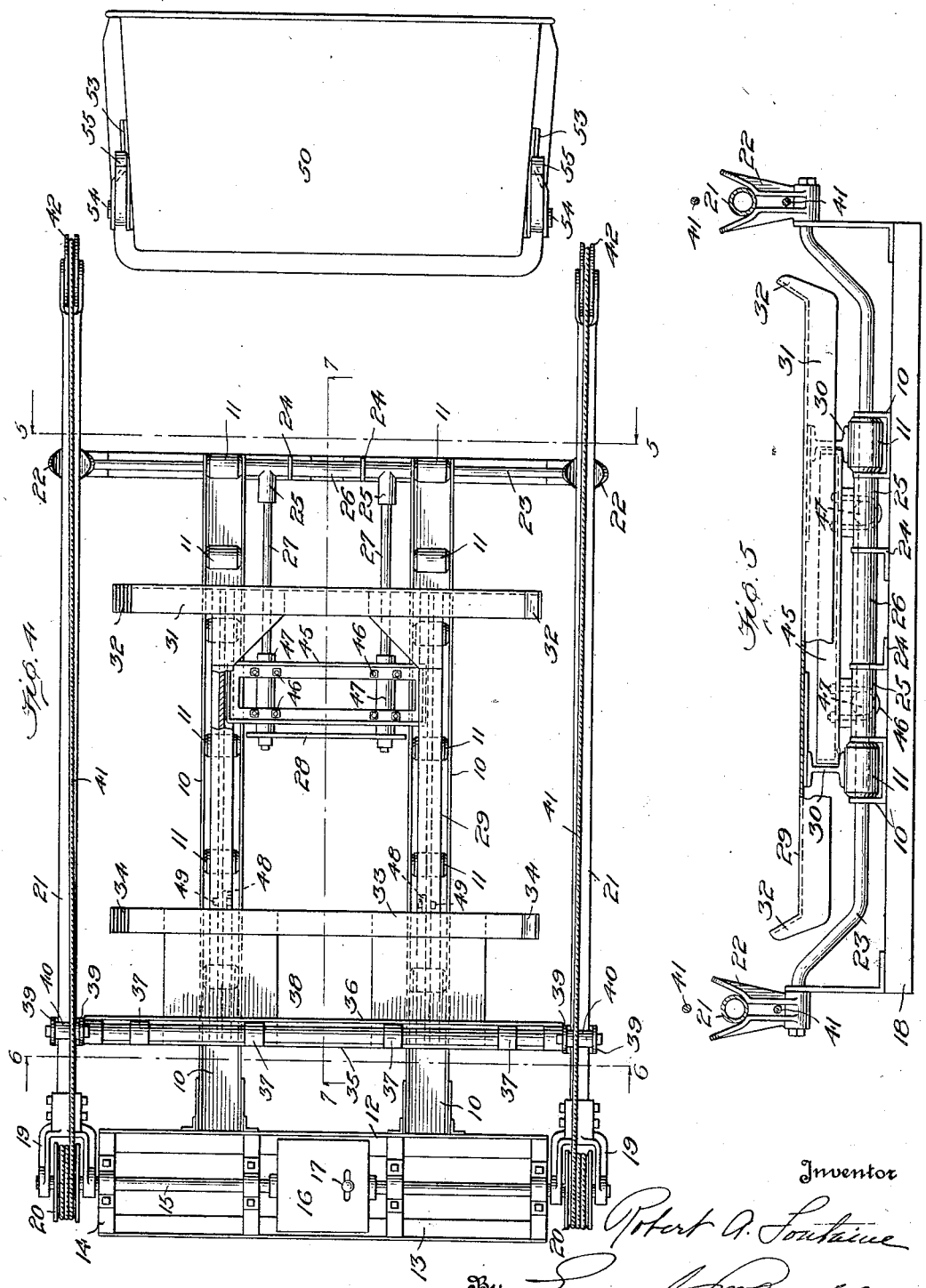

Patented July 12, 1932

1,866,640

UNITED STATES PATENT OFFICE

ROBERT A. FONTAINE, OF MARTINSVILLE, VIRGINIA

SHIFTABLE BODY TRUCK

Application filed September 25, 1929. Serial No. 395,170.

The invention relates to trucks for handling materials, particularly bricks and the like, and has for its general object the provision of a truck having a movably mounted body with operating means therefor well adapted for facilitating the loading and unloading of building or other materials.

An important object of the invention is to provide a truck of this character in which the body mounting is of such character that the body may be deposited upon a higher level than that upon which the truck wheels are standing.

Another object of the invention is to provide a truck equipped with novel stop means for limiting the lowering movement of the body in accordance with surface conditions, the degree of inflation of the truck tires, etc., so as to prevent the body from coming into violent contact with the ground or other surface.

A still further object is to provide a truck in which the body is mounted upon a cradle and slidable with respect thereto and in which the cradle is pivoted and slidable with respect to the truck frame whereby the shifting of the body from carrying to unloading or from loading to carrying position may be readily effected.

Another object of the invention is to provide a truck in which the construction and mounting of the body carrying cradle are such as to prevent lateral displacement with respect to the supporting frame and the antifriction means mounted therein.

A more specific object of the invention is to provide a truck having movably mounted booms along which the cradle may move and which will operate to guide the body during shifting thereof from carrying to loading or unloading position.

Another object is to provide a device of this character in which there is a cable and windless mechanism associated with the booms for effecting movement of the body from one position to another by power means.

Another specific object is to provide a truck of this type in which the connection of the power operated body moving means with the body is at such a location as to effect raising of the center of gravity of the load upon the initial application of force for drawing the body onto the truck.

A further object is to provide a truck in which the booms are swingable and in which means is provided for supporting these booms when in normal or horizontal position.

The invention also contemplates the provision of various details in the structural characteristics and in the arrangement and location of the various parts whereby less power will be necessary for effecting loading or unloading.

An additional object is to provide a device of this character which will be comparatively simple and inexpensive to make and assemble, positive in action, efficient and durable in service, and a general improvement in the art.

Figure 2:
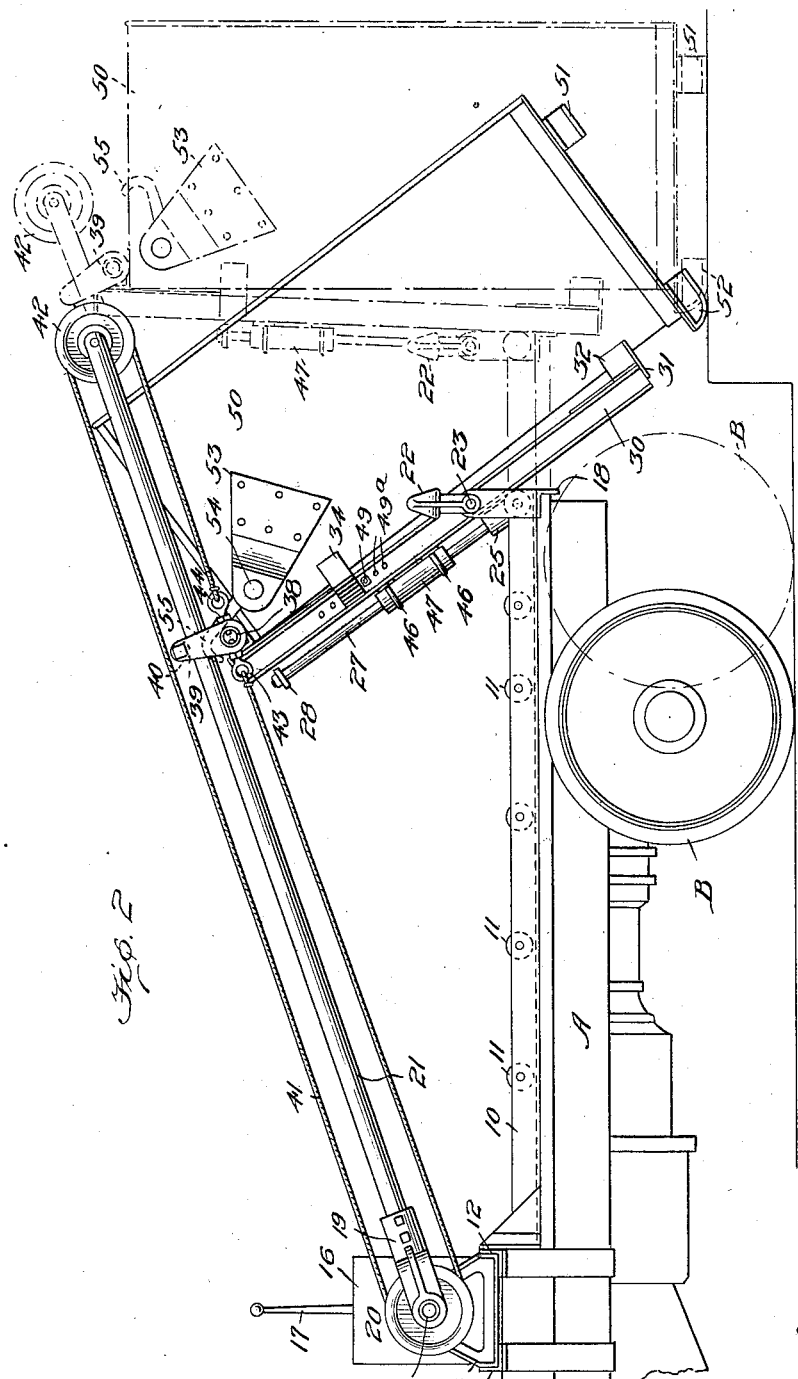

To the attainment of the foregoing and other objects and advantages, the invention preferably consists in the details of construction and the arrangement and combination of parts to be hereinafter more fully described and claimed, and illustrated in the accompanying drawings in which:

Figure 1 is a side elevation of the device with the body shown in normal or load carrying position, Figure 2 is a similar view illustrating the act of unloading and setting the body on a surface higher than that upon which the truck wheels rest, Figure 3 is a similar view illustrating the act of depositing the body onto the same level as that upon which the wheels rest, Figure 4 is a plan view, Figure 5 is a vertical cross section taken on the line 5—5 of Figure 4, Figure 6 is a vertical cross sectional view taken on the line 6—6 of Figure 4, Figure 7 is a vertical longitudinal section taken on the line 7—7 of Figure 4.

Referring more particularly to the drawings I have shown a portion of a motor truck A which carries or to which is applied my novel body construction and operating mechanism therefor. The truck is represented as having the usual chassis mounted upon wheels B and of course embodying a motor, transmission mechanism, control means and other features common to and necessary in truck construction. Obviously such details do not need to be disclosed in the present application which relates only to the body structure and mounting therefor.

In carrying out the invention I provide the truck with a pair of longitudinally extending spaced parallel channel bars 10 arranged with their open sides upwardly and containing, each, a series of rollers 11 journaled in any preferred manner. At their forward ends these channel bars are secured by any suitable means to the rear angle bar 12 of a frame structure which includes a forward angle bar 13 and a plurality of upstanding brackets 14 through which is journaled a shaft 15 extending into a transmission box 16 containing mechanism, not shown, for driving the shaft 15 in a selected direction. The control means and gear mechanism in this casing 16 may be, if desired, constructed in accordance with what is disclosed in either or both of my prior Patents, No. 1,626,229 for transmission mechanism granted April 26, 1927 and No. 1,637,338 for power hoist granted August 2, 1927. There is shown protruding from this casing 16 a control lever 17 for the purpose of controlling the clutching of the shaft 15 to whatever drive is provided and for controlling the direction of rotation of the shaft 15. At their rear ends the channel bars 10 are mounted and secured upon a cross bar 18.

Journaled upon the projecting ends of the shaft 15 are brackets 19 which may be U-shaped and which straddle winding drums 20 fast on the shaft. These brackets constitute mountings for the forward ends of booms 21 which are capable of vertical swinging movement about the shaft 15 as an axis. Ordinarily these booms are supported in horizontal position by bracket arms 22 on the outer ends of a transverse rod 23 which extends through the rear ends of the channel bars 10 and through angle brackets 24 mounted on the cross bar 18. This rod 23 may constitute the journal for the two rearmost rollers 11.

The main or foundation part of the structure also includes T's 25 rotatably engaged upon the rod 23 between the brackets 24 and the channel bars 10, it being preferable to provide a spacing sleeve 26 surrounding the rod 23 between the brackets 24 for maintaining the parts in the proper relation. The T's 25 carry guide rods 27 which project forwardly and which are connected at their front ends by a transverse bar or strip 28 held in place in any desired manner.

The cradle is designated generally by the numeral 29 and is shown as comprising a pair of I-bars 30 resting upon the rollers 11 and connected at their rear ends by a transverse bar 31, which may be of inverted L-shape and which has upturned end portions 32. The bars 30 are also connected near their forward ends by a bar 33 likewise provided with upturned ends 34 similar to the ends 32. At the forward extremities of the bars 30 I have shown an inverted L-shaped transversely arranged bar 35 secured thereto and carrying an L-shaped or angle bar 36 on which are supporting elements 37 through which extends a transverse rod or pipe 38 on the ends of which are upstanding arms 39 carrying suitably journaled rollers 40 travelling along the booms 21.

The means for moving the cradle structure 29 forwardly and rearwardly is shown as comprising cables 41 which are trained about pulleys 42 at the rear ends of the booms 21 and which are also wrapped about the drums 20, the ends of the cables being attached to I-bolts 43 and 44 projecting respectively forwardly and rearwardly from the pipe or rod 38. Clearly, when the drums 20 are turned by whatever drive mechanism is provided in the casing 16 the cables 41 will be caused to move for sliding the cradle bodily forwardly or rearwardly along the frame, friction being reduced owing to the provision of the rollers 11.

Located between and slidable with respect to the bars 30 of the cradle is a carriage 45 carrying at its bottom, as by means of U-bolts 46, sleeve 47 slidable upon the respective guide rods 27. The purpose of this carriage is to limit rearward sliding movement of the cradle 29 under certain circumstances and for this reason I provide angular stops 48 disposed against the inner sides of the bars 30 and held in any selected position as by means of bolts 49 passing through the respective stops and through the proper ones of selected holes 49ᵃ in the bars 30. As mentioned above, the rearward movement of the cradle is limited by engagement of the stops 48 with the carriage 45, and movement of the cradle together with the carriage 45 is limited by engagement of the latter with the T's 25. By virtue of the presence of the carriage 45 which has its ends adjacent the inner faces of the bars 30, combined with the engagement of the sleeve 47 carried by the carriage with the guides 27, it will be apparent that any movement of the cradle transversely of the frame will be prevented. This means that the cradle cannot slip off from the antifriction rollers 11.

The body itself is designated by the numeral 50 and is formed preferably as a rectangular box-like structure with an open top and with its bottom, or rear end depending upon the position in which it is, equipped with shoes 51 and 52, the latter projecting beyond the bottom or back of the body with said projecting portion curved. There are two of each type of shoe and the two designated at 52 serve the purpose of rockers. This body rests upon the cradle, that is to say upon the bars 31 and 33 when in travelling position and is prevented from lateral displacement by the upturned ends 32 and 34 of the bars. Mounted on the sides of the body are brackets 53 within which are pivoted, at 54, hooks 55 which are adapted to engage over the transverse rod or pipe 38 under normal conditions but which are disengageable therefrom to permit detachment of the body when such is desired. While the body is capable of handling building material, as above stated, it is particularly adapted for use in handling stacks of bricks or building blocks arranged in similar formation, the idea being that stacks of bricks may be loaded, transported and subsequently unloaded while remaining intact, this being the most modern and approved way.

In the operation of the device, it will be seen that under normal circumstances, that is to say when a load is being transported from place to place, the body 50 rests in horizontal position, with its open side up, on the bars 31 and 33 of the cradle and with the hooks 55 engaged over the transverse member 38, all as clearly illustrated in Figure 1. At such a time the cradle 29 is at its forwardmost position where it is held by the tension on the cables 41. When it is desired to deposit the load upon the ground or other surface, the drive mechanism within the casing 16 is operated for rotating the shaft 15 and consequently the drums 20. This rotation in the proper direction will cause the lower stretches of the cables to move rearwardly, the cradle 29 being dragged rearwardly also until the stops 48 engage against the front of the carriage 45. The cradle, carrying the body, together with the carriage will then move rearwardly an additional amount owing to the slidability of the carriage along the guide rods 27. As soon as the center of gravity of the body, cradle and load passes beyond the ends of the channel bars 10, the body and cradle will tilt upon the transverse member 23 as an axis and will swing downwardly so that the shoes 52 will engage the ground or other surface. As this movement occurs the booms 21 will of course swing upwardly about the shaft 15 as a pivot. The body remains attached to the truck as the hooks 55 are engaged over the transverse member 38. As the body tilts downwardly it is apparent that the carriage 45 will strike against the T's 25 so that the downward sliding and tilting movement of the body will be limited, this feature being of importance as it prevents violent contact of the shoes 52 with the ground or other surface. As the tilting continues and the body assumes the position shown in full lines in Figure 3, it is intended that the truck brakes be released so that the truck may roll back slightly to permit the body to be deposited on the ground in a vertical position. This will occur because the rear shoes 52 are curved and will permit the body to rock into upright position with the shoes 51 also engaging the ground. The hooks 55 may then be disengaged from the transverse member 38 if it is desired to leave the body surrounding the load. It is apparent that the load may be dumped by the simple expedient of pushing the body over so that its open side or top will be disposed downwardly. If the body be constructed, for instance, as shown in my Patent No. 1,736,074 granted November 19th, 1929, it may be readily disengaged from about a stack of bricks or the like contained within it. The adjustability of the stops 48 is important as these stops will determine the point at which the rear shoes 52 will engage the ground, it being clear that this point must depend upon the degree of inflation of the truck tires and the surface conditions where unloading is to be effected as it is conceivable that an inclined surface might make a material difference. This adjustability is of great importance in another respect, namely as it permits unloading onto a surface higher than that upon which the truck wheels stand.

Referring to Figure 2, it will be observed that the body may be easily deposited onto a higher level than that occupied by the truck. Such a condition occurs if a load is to be deposited onto a sidewalk while the truck is standing in the street, or if unloading onto a platform at a railroad siding is desired. Other circumstances and conditions will readily suggest themselves. In all of the unloading operations it will be observed that the body simply tilts back after one edge first strikes the ground or other surface, the truck itself moving bodily backwards more or less slowly so as to control the movement of the body from tilted into upright position.

Loading is effected in a manner the reverse of that above described. In such an instance the hooks on the body are engaged over the member 38 and the truck is moved rearwardly with the body in upright position. The body may then, if constructed as shown for example in said allowed application, be moved into inclosing relation to a stack of bricks or the like. If loose material is to be picked up, the body can be forced into it and consequently be partially or entirely filled. In either instance the hoisting mechanism is operated to wind the lower stretches of the cables forwardly so that the body will first be tilted forwardly and then, together with the cradle, be drawn onto the truck with the cradle resting upon the rollers 11 in the channel bars 10 as described in connection with the normal position of the parts. A feature to be noted is that when the body is tilted forwardly from its upright position, preparatory to loading it onto the truck the shifting of the center of gravity of the body and load will operate to assist in the loading action so that a less expenditure of power will be necessary than if such were not the case.

From the foregoing description and a study of the drawings it will be apparent that I have thus provided a simply constructed and yet highly efficient truck by means of which materials of various sorts, particularly bricks and the like either in stack or loose form, may be loaded, transported and unloaded or vice versa. Ample provision has been made to prevent undue shock to the body and load when unloading and it has also been made possible to unload readily onto a platform or other elevated surface. The parts have been so constructed, arranged and related as to prevent accidental displacement thereof at all times. It is believed that the construction, operation and advantages should be readily apparent to one skilled in the art without further explanation.

While I have shown and described the preferred embodiment of the invention, it should be understood that the disclosure is merely an exemplification of the principles involved as the right is reserved to make all such changes in the details of construction as will widen the field of utility and increase the adaptability of the device provided such changes constitute no departure from the spirit of the invention or the scope of the claims hereunto appended.

Having thus described the invention, I claim:

1. In a truck, the combination of main guide bars, a cradle movable longitudinally therealong, a hoisting mechanism including booms pivoted at the forward portion of the truck extending rearwardly, guide means on the cradle engaging and travelling along the booms, and a removable body normally seated upon the cradle and having means detachably connected with a portion of the guide means.

2. In a truck, main guide bars extending longitudinally of the frame thereof, a cradle resting upon and movable longitudinally of said bars, rearwardly extending booms pivoted at their forward ends near the forward ends of said bars, means on the cradle permanently engaging and travelling along the booms, a winding mechanism including cables extending along the booms and connected with the cradle, and a removable body normally resting upon the cradle and having pivoted hook means detachably engaging the cradle.

3. In a truck, main guide bars extending longitudinally of the frame thereof, a cradle resting upon and movable longitudinally of said bars and swingable with respect thereto, rearwardly extending booms pivoted at their forward ends near the forward ends of said bars, means on the cradle permanently engaging and travelling along the booms, a winding mechanism including cables extending along the booms and connected with the cradle, a removable body normally resting upon the cradle, securing elements detachably connecting the body with the cradle, and means beneath and swingable with the cradle and slidable with respect thereto for limiting its longitudinal movement.

4. In a truck, main guide bars extending longitudinally of the frame thereof, a cradle resting upon and movable longitudinally of said bars, rearwardly extending booms pivoted at their forward ends near the forward ends of said bars, means on the cradle permanently engaging and travelling along the booms, a winding mechanism including cables extending along the booms and connected with the cradle, a removable body normally resting upon the cradle, securing elements detachably connecting the body with the cradle, and means pivoted and movable longitudinally with respect to the bars and cooperating with the cradle for limiting rearward movement thereof.

5. In a truck, a frame including longitudinally extending main bars, a cradle movable longitudinally along said bars, booms pivoted on the frame near the forward ends of said bars and carrying pulleys, a power driven windlass mechanism including drums, cables wrapped about said drums and engaged about said pulleys and connected with the forward end of the cradle, means on the forward end of the cradle engaging and travelling along the booms when the cradle is moved, a body normally resting upon the cradle and carrying means detachably engageable with the forward end of the cradle, pivoted guide means for the cradle, and coacting means on the guide means and cradle for limiting longitudinal movement of the latter.

6. In a truck, a frame including longitudinally extending main bars, a cradle movable longitudinally along said bars, booms pivoted on the frame near the forward ends of said bars and carrying pulleys, a power driven windlass mechanism including drums, cables wrapped about said drums and engaged about said pulleys and connected with the forward end of the cradle, means on the forward end of the cradle engaging and travelling along the booms when the cradle is moved, a body normally resting upon the cradle and carrying means detachably engageable with the forward end of the cradle, and means for preventing lateral shifting of the cradle with respect to said bars, comprising a guide structure carried by the frame and located between said bars, and a frame structure confined by the cradle and slidable along said guide structure.

7. In a truck, a frame including longitudinally extending main bars, a cradle including spaced beams movable longitudinally of said bars, booms pivoted on the frame near the forward ends of said bars and carrying pulleys, a power driven windlass mechanism including drums, cables wrapped about said drums and engaged about said pulleys and connected with the forward end of the cradle, means on the forward end of the cradle engaging and travelling along the booms when the cradle is moved, a body normally resting upon the cradle and carrying means detachably engageable with the forward end of the cradle, longitudinally extending members pivoted at the rear of the frame, and a frame slidable along said members and confined between said beams.

8. In a truck, a frame including longitudinally extending main bars, a cradle movable longitudinally along said bars, booms pivoted on the frame near the forward ends of said bars and carrying pulleys, a power driven windlass mechanism including drums, cables wrapped about said drums and engaged about said pulleys and connected with the forward end of the cradle, means on the forward end of the cradle engaging and travelling along the booms when the cradle is moved, a body normally resting upon the cradle and carrying means detachably engageable with the forward end of the cradle, guide means pivoted at the rear ends of said bars, means slidable along said guide means, and stop means on the cradle engageable with said last named means.

9. In a truck, a frame including longitudinally extending main bars, a cradle movable longitudinally along said bars, booms pivoted on the frame near the forward ends of said bars and carrying pulleys, a power driven windlass mechanism including drums, cables wrapped about said drums and engaged about said pulleys and connected with the forward end of the cradle, means on the forward end of the cradle engaging and travelling along the booms when the cradle is moved, a body normally resting upon the cradle and carrying means detachably engageable with the forward end of the cradle, guide means pivoted at the rear ends of said bars, means slidable along said guide means, and stop means on the cradle engageable with said last named means, said stop means being adjustable for limiting the degree of downward and rearward movement of the cradle and body.

10. In a truck, a frame including longitudinally extending main bars, a cradle slidable along said bars, a boom structure pivoted near the forward ends of said bars, means at the forward end of the cradle engaging and movable along the booms, means connected with the cradle for moving the same longitudinally, a body normally resting upon the cradle and carrying means detachably engaged therewith for normally holding the body upon the cradle, guide means pivoted at the rear ends of said bars, a carriage slidable along said guide means, and stop means on the cradle engageable with said carriage.

11. In a truck, a frame including longitudinally extending main bars, a cradle slidable along said bars, a boom structure pivoted near the forward ends of said bars, means at the forward end of the cradle engaging and movable along the booms, means connected with the cradle for moving the same longitudinally, a body normally resting upon the cradle and carrying means detachably engaged therewith for normally holding the body upon the cradle, guide means pivoted at the rear ends of said bars, a carriage slidable along said guide means, stop means on the cradle engageable with said carriage, and means for securing the stop means at different selected positions in the length of the cradle for varying the extent of rearward and downward movement of the cradle and body.

12. In a truck, a frame including longitudinally extending channel bars containing anti-friction rollers, a cradle movable longitudinally of said bars and engaging upon said rollers, a shaft journaled transversely of the frame near the forward ends of said bars and provided with a power transmission mechanism and equipped with winding drums, booms pivoted upon said shaft and carrying pulleys, means on the cradle engaging and travelling along the booms when the cradle is moved, cables engaged about the drums and pulleys and connected with the forward end of the cradle for moving the same, a body normally resting upon and having means detachably connecting it with the cradle, and movable means carried by said frame and cooperating with the cradle for limiting rearward movement thereof and preventing lateral displacement.

13. In a truck, a frame including longitudinally extending channel bars containing anti-friction rollers, a cradle movable longitudinally of said bars and engaging upon said rollers, a shaft journaled transversely of the frame near the forward ends of said bars and provided with a power transmission mechanism and equipped with winding drums, booms pivoted upon said shaft and carrying pulleys, means on the cradle engaging and travelling along the booms when the cradle is moved, cables engaged about the drums and pulleys and connected with the forward end of the cradle for moving the same, a body normally resting upon and having means detachably connecting it with the cradle, and slidable means pivoted at the rear end of the frame and engageable by the cradle for limiting rearward movement thereof and guiding it and the body during tilting movement downwardly.

14. In a truck, a frame including longitudinally extending channel bars containing anti-friction rollers, a cradle movable longitudinally of said bars and engaging upon said rollers, a shaft journaled transversely of the frame near the forward ends of said bars and provided with a power transmission mechanism and equipped with winding drums, booms pivoted upon said shaft and carrying pulleys, means on the cradle engaging and travelling along the booms when the cradle is moved, cables engaged about the drums and pulleys and connected with the forward end of the cradle for moving the same, a body normally resting upon and having means detachably connecting it with the cradle, slidable means beneath the cradle pivoted at the rear end of the frame and engageable by the cradle for limiting rearward movement thereof and guiding it and the body during tilting movement downwardly, and supporting members at the rear end of the frame normally maintaining the booms in horizontal position, the booms being free to swing upwardly upon tilting movement of the cradle and body.

15. In a truck including main bars, a cradle movable therealong and means for moving the cradle longitudinally, a body on the cradle detachably connected therewith, guide rods pivoted at the rear end of the truck and extending longitudinally thereof, a carriage slidable along said guide rods, and stop means on the cradle engageable with said carriage.

16. In a truck including main bars, a cradle movable therealong and means for moving the cradle longitudinally, a body on the cradle detachably connected therewith, guide rods pivoted at the rear end of the truck and extending longitudinally thereof, a carriage slidable along said guide rods, and stop means on the cradle engageable with said carriage, the cradle including side bars and said carriage traversing the space between said side bars and operating to prevent lateral shifting of the cradle with respect to the main bars.

17. In a truck including a frame, a cradle movable therealong, means for moving the cradle longitudinally thereof, a body on the cradle detachably connected with the forward end thereof, means pivoted at the rear of said frame and movable longitudinally with respect thereto and located beneath the cradle, and means on the cradle engageable with said means for limiting the rearward movement of the cradle.

18. In a truck including a frame, a cradle movable therealong, means for moving the cradle longitudinally thereof, a body on the cradle detachably connected with the forward end thereof, means pivoted at the rear of said frame and movable longitudinally with respect thereto and located beneath the cradle, means on the cradle engageable with said means for limiting the rearward movement of the cradle, and means for limiting the rearward movement of said second named means.

19. In a truck, a frame including main bars, a cradle slidable along the main bars, a body supported by the cradle and detachably connected therewith, adjustable stop means on the cradle, means slidable and pivotally supported with respect to the frame disposed in the path of travel of and engageable by said stop means for limiting rearward movement of the cradle.

20. In a truck, a frame, a cradle slidable therealong, a body supported by the cradle and detachably connected therewith, adjustable stop means on the cradle, guide means pivoted with respect to said frame, other stop means slidable on said guide means disposed in the path of travel of and engageable by said first named stop means for limiting rearward movement of the cradle, said last named means also cooperating with the sides of the cradle to prevent lateral displacement thereof and to guide it during its movement.

In testimony whereof I affix my signature.

ROBERT A. FONTAINE.